United States Patent [19]
Greenspan et al.

[11] 3,980,996
[45] Sept. 14, 1976

[54] SELF-SUSTAINING ALARM TRANSMITTER DEVICE

[76] Inventors: Myron Greenspan, 154 Girard St., Brooklyn, N.Y. 11235; Abraham Friedman, 2205 E. 27th St., Brooklyn, N.Y. 11229

[22] Filed: Sept. 12, 1973

[21] Appl. No.: 396,539

[52] U.S. Cl. ............................... 340/224; 325/185; 320/1; 322/2 R; 320/2; 340/421
[51] Int. Cl. ........................................... G08b 21/00
[58] Field of Search ............ 340/213 R, 224, 152 T, 340/189 M; 325/185, 492, 113; 320/2, 61, 1; 322/2; 310/2, 4 R; 736/206

[56] References Cited
UNITED STATES PATENTS

| | | | |
|---|---|---|---|
| 2,510,397 | 6/1950 | Hansell | 310/4 |
| 2,780,765 | 2/1957 | Chapin et al. | 320/2 |
| 2,813,242 | 11/1957 | Crump | 322/2 |
| 2,910,579 | 10/1959 | Jones | 340/152 T |
| 3,050,684 | 8/1962 | Sclar | 322/4 |
| 3,090,207 | 5/1963 | Smith et al. | 322/2 |
| 3,195,540 | 7/1965 | Waller | 320/2 |
| 3,205,482 | 9/1965 | Taylor | 340/171 R |
| 3,299,424 | 1/1967 | Vinding | 340/189 M |
| 3,366,805 | 1/1968 | Shapiro | 320/61 |
| 3,377,616 | 4/1968 | Auer | 340/152 T |
| 3,559,194 | 1/1971 | Bisberg | 340/224 |
| 3,665,312 | 5/1972 | Jarvis | 340/224 |
| 3,772,669 | 11/1973 | Johnston et al. | 340/224 |
| 3,781,647 | 12/1973 | Glaser | 310/4 |

*Primary Examiner*—Thomas B. Habecker
*Attorney, Agent, or Firm*—Friedman & Goodman

[57] ABSTRACT

An alarm transmitter device includes a storage element which stores electrical charge and which energizes an output transmitting circuit upon the occurrence of an alarm condition. To maintain the storage element at full charge or in ready standby mode, a trickle charging circuit is provided which includes an energy conversion device for converting solar energy, broadcast electromagnetic energy, heat energy or the like into an electrical current suitable for trickle charging the storage element. After the storage element is substantially discharged, subsequent to an occurrence of an alarm condition, a battery or other source of electrical energy is connectable to terminals connected to the storage element for initially rapidly recharging the storage element to the fully charged state.

9 Claims, 2 Drawing Figures

SELF-SUSTAINING ALARM TRANSMITTER DEVICE

BACKGROUND OF THE INVENTION

The present invention generally relates to alarm devices and more particularly to an alarm condition transmitter device which includes an energy conversion device for converting an available predetermined form of energy into electrical energy for charging an energy storing element, within the alarm device, for continuously maintaining the latter in a ready or standby mode.

Various alarm systems are already known. With most conventional alarms, expensive wiring is required for interconnecting the switch transducers placed at the openings or apertures of a chamber to be protected and the control device, as well as with the alarm indicating device. The interconnecting wiring is inconvenient and time consuming to install and substantially raises the cost of installation of the alarm system. Additionally, the interconnecting wiring is frequently left exposed, this sometimes being unacceptable for aesthetic reasons.

To overcome the interconnecting wiring problem, it has been proposed that transmitter devices be utilized at the openings of the protected chamber or enclosure, which transmitter devices transmit a predetermined signal upon the occurrence of an alarm condition. The transmitted signal is received by a suitable receiver situated within or nearby the chamber being protected. Typically, such transmitters have utilized oscillator circuits. When an alarm condition occurs, the oscillator circuit is energized and the latter transmits a selected frequency or frequencies or tones which can be distinguished by the receiver control device. A disadvantage of the hitherto proposed transmitter devices has been their utilization of batteries for the energization of the output circuits. As is evident, the requirement for battery use is undesirable because batteries must periodically be replaced. Further, the battery does not always display the same high or initial voltage as when the battery is fresh or fully charged. With passage of time, it is difficult to ascertain, without expensive and time consuming procedures, the exact voltage or energy which the battery can provide in the event of an emergency or alarm condition. Consequently, in addition to the expensive maintenance requirement with batteries, the same are not always reliable or predictable with passage of time and malfunction of the alarm system may occur if the transmitter devices are not continuously supervised and checked.

SUMMARY OF THE INVENTION

Accordingly, it is an object of the present invention to provide an alarm transmitter device which is not possessed of the above described disadvantages of battery operated transmitter devices.

It is another object of the present invention to provide an alarm transmitter device which is self sustaining and which does not require the periodic changing of batteries.

It is still another object of the present invention to provide an alarm transmitter device which includes a storage element which is maintained in a substantially fully charged condition by means of a trickle charge provided by an energy converting device which converts an available predetermined form of energy into electrical energy for charging the storage element.

It is yet another object of the present invention to provide an alarm transmitter device which includes means for rapidly recharging a storage element of the type above suggested subsequent to the discharging of the same after a test or alarm condition.

In order to achieve the above objects, as well as others which will become apparent hereafter, an alarm condition transmitter device in accordance with the present invention includes a rechargeable storage means for storing electrical charge. Energy conversion means is provided which is connected to said storage means for converting a predetermined form of available energy into electrical energy and for charging said storage means. Output circuit means is provided for generating and transmitting an alarm signal when energized. Switch means are provided which act between said storage means and said output circuit means for energizing the latter with the charged stored on the former only upon the occurrence of an alarm condition. In this manner, said storage means is continuously charged when said predetermined form of energy is available and is in standby mode for energizing said output circuit means upon the occurrence of an alarm condition.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which.

DESCRIPTION OF THE PREFERRED EMBODIMENTS

Figure 1:
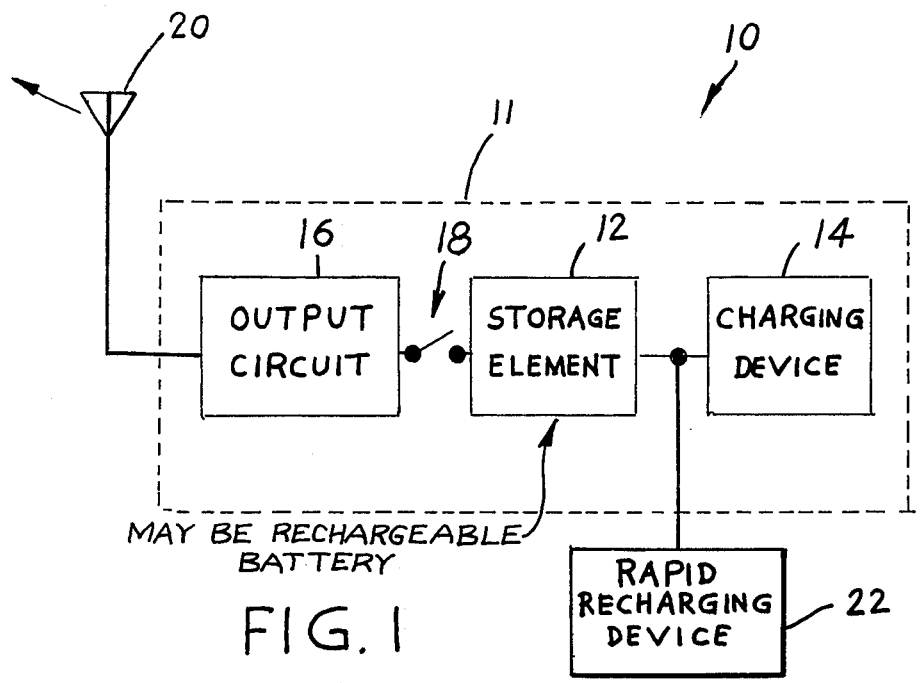
FIG. 1 is a schematic representation in block diagram form of an alarm condition transmitter device in accordance with the present invention, showing a rapid recharging device for recharging a storage element subsequent to the discharging of the same during a test or alarm condition.

Referring now to the drawings, and first referring to FIG. 1, a transmitter device in accordance with the present invention is generally designated by the reference numeral 10. A transmitter device unit of the present invention is shown within the dashed box 11.

An important feature of the present invention is the provision of a storage element 12 which is suitable for storing electrical charge. The storage element 12 may be in the form of a capacitor or may be in the form of a rechargeable battery. Energy conversion means in the form of a charging device 14 is provided which is connected to the storage element 12. The charging device 14 serves the function of converting a predetermined form of available energy into electrical energy and for charging the storage element 12. The precise nature of the predetermined form of energy and the precise nature of the energy conversion device 14 is not critical for the purpose of the present invention. It is only important that the charging device 14 converts an available source of external energy proximate to the transmitter device 10 for converting the same into an electrical charging current.

For example, the charging device 14 may be in the form of a photocell or photodiode which receives solar energy and converts the same into electrical power output. Photocells of this type typically have efficiencies from 3 to 5 percent to approximately 15 percent maximum. This conversion efficiency defines the ratio of the electrical power output to the solar power incident on the cell. Solar energy, generally available at apertures or openings of an enclosure or chamber to be protected, such as windows, varies in intensity with time of day, distance of the earth from the sun, as well as climatic conditions. However, the total irradiance which is available at a mean sun-earth distance is approximately equal to 0.140 W/cm². The photocells of the type under discussion are typically utilized in space applications for solar cells or batteries.

In full sunlight, a good silicon cell will develop approximately 0.6 volts, open circuit when operating at a conversion efficiency of 10 to 12 percent. When higher voltages are desired, the photocells can be connected in series while parallel connection offers higher charging currents. The precise arrangement of solar cells, or the manner or interconnection therebetween is not critical for the purposes of the present invention. The charging device 14 in FIG. 1 represents an arrangement readily ascertainable by those skilled in the art suitable for charging the storage element 12 for the purposes under discussion.

Alternately, the charging device 14 can operate on a form of energy in the form of airwaves or broadcast electromagnetic radiation. In standard, as well as other forms of broadcasting, the authorities require that minimum energy densities of the broadcast signals be available for reception. For example, in standard broadcasting, a station broadcasting within the 535 to 1605 KHz band must provide at least 2–50 millivolts per meter within city limits. As should be clear, the multitude of stations transmitting under normal conditions causes ample electromagnetic radiation to be available. The electromagnetic radiation, when picked up and processed, such as by rectification, is frequently sufficient to generate a trickle charging current. This is particularly true when the receiving device is broadband and receives or picks up the electromagnetic radiation over a wide frequency range to thereby receive numerous stations, this essentially multiplying the energy densities supplied by each broadcaster.

Another form of energy which is readily available is heat energy. Accordingly, the charging device 14 may be in the form of a thermocouple wherein temperature gradients or variations in temperature are caused to generate the trickle charge current. At room temperature, metals have a Seebeck coefficient from a few tenths to as high as 40 microvolts per degree Centigrade for some alloys. Semi-metals such as bismuth have a Seebeck coefficient from 20 to 40 microvolts per degree Centigrade. Semi-conductors appear to be the most suitable for this purpose since the Seebeck coefficient for semi-conductors ranges from a few microvolts per degree Centigrade to as high as one millivolt per degree Centigrade.

The above examples of charging devices which incorporate energy conversion means are exemplary and not limiting. Any suitable means for converting a form of available energy into electric energy may be utilized for this purpose.

The storage element 12 is connected to an output circuit 16 by means of a normally opened switch 18. This minimizes the drain of charge from the storage means 12 during the standby mode. It may be possible, however, to utilize a normally closed switch with an appropriate output circuit 16 if charge drain can be made minimal.

The output circuit 16 is utilized for transmitting an alarm signal when energized. The output circuit may comprise an oscillator circuit, as conventionally utilized in the art. Alternately, the output circuit 16 may be in the form of an encoding circuit which generates a coded signal upon energization and transmits the same. It should be clear that the output circuit 16 may be of any suitable form conventional in the art for this purpose. The only function which the output circuit forms is to generate and transmit a predetermined signal suitable for detection upon the closing of the switch 18 during an alarm condition.

The switch 18 is shown schematically and may take any form desired and conventionally utilized in the art. For example, the switch 18 may comprise a magnetic switch or may comprise a manual switch. The switch 18 is normally maintained in the open position except during the occurrence of an alarm condition. At such time, the switch 18 closes and the charge stored on the storage element 12 is applied to the output circuit 16 for energizing the latter whereby the output circuit 16 generates the desired alarm signal and transmits the same.

Optionally, an antenna 20 may be connected to the output circuit 16 to permit the transmission of the alarm signal or to increase the transmitting range thereof. Any suitable or desirable antenna 20 conventionally known in the art may be utilized for this purpose.

In the presently preferred embodiment, an accessory rapid recharging device 22 is provided which is connectable to the input of the storage element 12 for rapidly recharging the same. In this manner, the storage element 12 can be initially rapidly charged subsequent to the discharging of the same after an alarm or test condition. Such rapid recharging assures a continuous standby or ready mode of the transmitter device 10. However, the rapid recharging device 22 is optional and full recharging of the storage element 12 may be accomplished solely with the charging device 14, normally after considerably greater time. Accordingly, as presently contemplated, the rapid recharging device 22 may be utilized to rapidly recharge the storage element to the full initial charge while the charging device 14 maintains that full charge by means of a trickle current to replenish the lost charge due to leakages and other charge losses.

Figure 2:
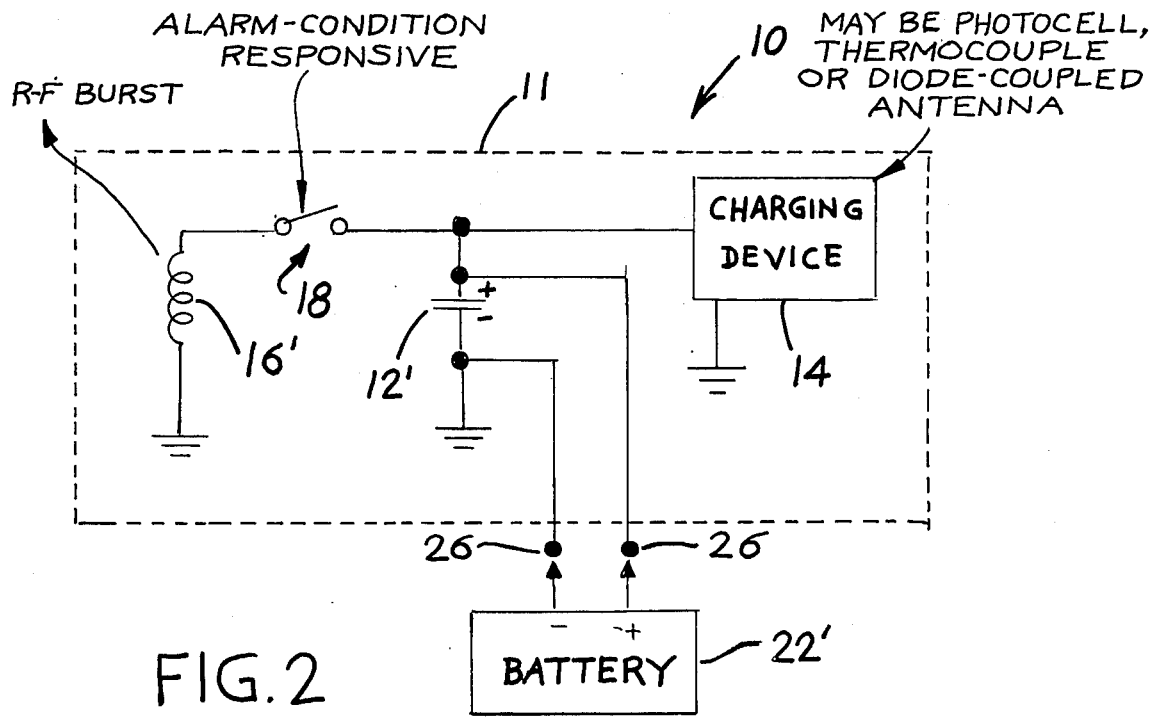
FIG. 2 is an electrical schematic, partly in block diagram form, of a specific embodiment of the present invention corresponding to the alarm device shown in FIG. 1.

In FIG. 2, one example of an alarm transmitter device 10 is shown wherein the charging device 14 is connected to the storage element in the form of a capacitor 12'. Advantageously, the capacitor has a low leakage factor and has a large enough capacity to store sufficient charge for energizing the output circuit for the required time. The output circuit 16 is shown in the form of a discharge coil 16'. When the switch 18 is closed the capacitor 12' discharges through the coil 16' to thereby generate an electromagnetic signal which is transmitted and receivable by a nearby receiver. As described above, the output circuit 16 may be substantially more complex, such as to generate coded output signals.

Advantageously, terminals 24 and 26, respectively connected to the positive and negative sides of the capacitor 12', are accessible exteriorly of the transmitter device unit 11. In this manner, the positive and negative terminals of an external battery 22' can be connected to the terminals 24, 26 to initially rapidly recharge the capacitor 12' to a full charge wherein the transmitter device is in ready or standby mode. During such recharging, it should be clear, the switch 18 is advantageously maintained in the open condition.

As should be clear to those skilled in the art, the above described invention is self sufficient and continuously recharges itself from an externally available energy source for maintaining the transmitter device in a ready or standby mode. The rapid recharging device 22 is optional and enhances the operation of the transmitter device soon after the transmitter device has been activated and the storage element has been discharged.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. Alarm condition transmitter device comprising rechargeable storage means for storing electrical charge; energy conversion means connected to said storage means for connecting a predetermined form of energy into electrical energy and for charging said storage means; output circuit means for transmitting an alarm signal when energized; and switch means connecting said storage means to said output circuit means for energizing the latter with the charge stored on the former only upon the occurrence of an alarm condition and for disconnecting all loads from said storage means prior to the occurrence of an alarm condition, whereby said storage means is continuously charged when said predetermined form of energy is available and is in standby mode for energizing said output circuit means upon the occurrence of an alarm condition, and whereby said storage means is charged during non-alarm conditions by removal of all loading conditions therefrom until an alarm condition occurs.

2. Alarm condition transmitter device as defined in claim 1, wherein the predetermined form of energy is solar energy, and wherein said energy conversion means includes a photocell for converting the solar energy into electrical energy.

3. Alarm condition transmitter device as defined in claim 1, wherein the predetermined form of energy is broadcast electromagnetic radiation, and wherein said energy conversion means includes means for picking up said electromagnetic radiation and for converting the same into an electrical current suitable for charging said storage means.

4. Alarm condition transmitter device as defined in claim 3, wherein said means for converting said electromagnetic radiation into an electrical current comprises rectifying means for rectifying said electromagnetic radiation.

5. Alarm condition transmitter device as defined in claim 1, wherein said storage means comprises a rechargeable battery.

6. Alarm condition transmitter device as defined in claim 1, wherein said storage means comprises a capacitor, whereby substantially all the stored charge on said capacitor is substantially instantaneously discharged through said output circuit means.

7. Alarm condition transmitter device as defined in claim 1, wherein the predetermined form of energy is heat energy and wherein said energy conversion means comprises a thermocouple.

8. Alarm condition transmitter device as defined in claim 1, wherein said output circuit means comprises a coil through which said storage means is discharged upon the occurrence of an alarm condition.

9. Alarm condition transmitter device as defined in claim 1, further comprising terminal means connected to said storage means accessible for connection to a source of electrical energy for rapidly charging said storage means, whereby said storage means can be initially rapidly charged subsequent to an alarm condition which substantially discharges said storage means and whereby said energy conversion means substantially maintains the charged stored on said storage means at the initial level by providing a trickle charge therefor.

* * * * *